(12) United States Patent
Ecklund et al.

(10) Patent No.: US 7,039,591 B2
(45) Date of Patent: May 2, 2006

(54) CONFIGURING ARCHITECTURE FOR MOBILE ACCESS TO AT LEAST ONE BUSINESS RESOURCE

(75) Inventors: Terry Robert Ecklund, Overland Park, KS (US); Patrick Thomas O'Boyle, Kansas City, MO (US); Travis Scott Newkirk, Overland Park, KS (US); A. Elise Barton, Overland Park, KS (US); Damon Matthew Herbst, Shawnee, KS (US)

(73) Assignee: Accenture LLP, Chicago, IL (US)

( * ) Notice: Subject to any disclaimer, the term of this patent is extended or adjusted under 35 U.S.C. 154(b) by 578 days.

(21) Appl. No.: 10/059,502

(22) Filed: Jan. 29, 2002

(65) Prior Publication Data

US 2002/0103668 A1    Aug. 1, 2002

Related U.S. Application Data

(60) Provisional application No. 60/265,774, filed on Jan. 31, 2001.

(51) Int. Cl.
*G06F 17/60* (2006.01)
*H04B 1/034* (2006.01)
*H04Q 7/20* (2006.01)

(52) U.S. Cl. .............................. 705/1; 455/95; 455/437

(58) Field of Classification Search .................... 707/1, 707/4, 7, 8, 10, 100, 102; 705/5, 10, 27, 705/2, 1; 715/900; 455/95, 437
See application file for complete search history.

(56) References Cited

U.S. PATENT DOCUMENTS

| | | | |
|---|---|---|---|
| 5,694,120 A * | 12/1997 | Indekeu et al. | 340/7.23 |
| 5,761,662 A * | 6/1998 | Dasan | 707/10 |
| 5,936,547 A * | 8/1999 | Lund | 340/7.21 |
| 6,047,327 A * | 4/2000 | Tso et al. | 709/232 |
| 6,049,327 A * | 4/2000 | Walker et al. | 345/158 |
| 6,052,735 A | 4/2000 | Ulrich et al. | |
| 6,091,967 A | 7/2000 | Kruys et al. | |
| 6,272,341 B1 | 8/2001 | Threadgill et al. | |
| 6,300,948 B1 | 10/2001 | Geller et al. | |
| 6,560,604 B1 * | 5/2003 | Fascenda | 707/10 |
| 2001/0049688 A1 * | 12/2001 | Fratkina et al. | 707/104.1 |
| 2002/0057678 A1 * | 5/2002 | Jiang et al. | 370/353 |
| 2002/0077120 A1 * | 6/2002 | Tijerino | 455/456 |
| 2002/0087729 A1 | 7/2002 | Edgar | |
| 2002/0129354 A1 | 9/2002 | Bryan et al. | |
| 2002/0164004 A1 * | 11/2002 | Tamura et al. | 379/93.12 |

* cited by examiner

*Primary Examiner*—James Trammell
*Assistant Examiner*—Charlie C. L. Agwumezie
(74) *Attorney, Agent, or Firm*—Brinks Hofer Gilson & Lione

(57) ABSTRACT

A method of configuring an architecture for provision of mobile access to a wireless communication device provides a structured framework for defining a preferential configuration of the architecture. A target list of resources is established with respect to mobile access of a wireless communication device. A set of components, associated with each established resource, is retrieved to form a menu of components of an architecture. Component data, associated with respective components, is presented to facilitate the defining of a preferential configuration. An arrangement is selected of the components from the menu to form the preferential configuration of the architecture.

28 Claims, 4 Drawing Sheets

32

ENTERPRISE APPLICATION RESOURCES —40

> OFFICE ENABLEMENT APPLICATION RESOURCES —46
>
>> AN ELECTRONIC-MAIL APPLICATION RESOURCE
>> A SCHEDULING APPLICATION RESOURCE
>
> STANDARD OR HORIZONTAL BUSINESS APPLICATION RESOURCES  48
>
>> A CUSTOMER RELATIONS MANAGEMENT APPLICATION RESOURCE
>> AN ENTERPRISE RESOURCE PLANNING APPLICATION RESOURCE
>> A FIELD SUPPORT APPLICATION RESOURCE
>> A LOGISTICS APPLICATION RESOURCE
>> A PURCHASING APPLICATION RESOURCE
>> A SALES FORCE AUTOMATION APPLICATION RESOURCE
>> AN INVENTORY CONTROL APPLICATION RESOURCE
>> A POINT-OF-SALE APPLICATION RESOURCE
>
> CUSTOM OR VERTICAL BUSINESS APPLICATION RESOURCES  50
>
>> A TRANSPORTATION APPLICATION RESOURCE
>> A LENDING OR FINANCING APPLICATION RESOURCE
>> A BANKING APPLICATION RESOURCE
>> A FINANCIAL MANAGEMENT APPLICATION RESOURCE
>> A DISTRIBUTION OR RETAIL TRADE APPLICATION RESOURCE
>> A RECORD MANAGEMENT APPLICATION RESOURCE (E.G., HEALTH INSURANCE APPLICATION RESOURCE)
>> A USER-DEFINABLE CUSTOM BUSINESS APPLICATION RESOURCE

ENTERPRISE LEGACY SYSTEM RESOURCES  42

> A CUSTOMER RELATIONS MANAGEMENT APPLICATION RESOURCE
> A BILLING APPLICATION RESOURCE
> AN ENTERPRISE RESOURCE PLANNING APPLICATION RESOURCE
> A CUSTOMER INSIGHT OR MARKETING APPLICATION RESOURCE

SUPPORTING SERVICE SYSTEM RESOURCES  44

> A CUSTOMER CARE APPLICATION RESOURCE
> A HOSTING APPLICATION RESOURCE
> A PROCUREMENT APPLICATION RESOURCE
> A DEVICE MANAGEMENT AND PROVISIONING APPLICATION RESOURCE

BASIC COMPONENTS   _52_

> A PRESENTATION COMPONENT
> A SECURITY COMPONENT
> A BASIC ALERT COMPONENT
> A NAVIGATIONAL COMPONENT
> APPLICATION DEVELOPMENT COMPONENT
> TEST TOOLS COMPONENT
> AN OFF-LINE SYNCHRONIZATION COMPONENT
> A PROFILE MANAGEMENT COMPONENT
> MULTIPLE DEVICE COMPATIBILITY COMPONENT

ENHANCED COMPONENTS   _54_

> AN ENHANCED ALERT COMPONENT
> A VOICE RECOGNITION COMPONENT IDENTIFIER
> A LOCATION-BASED SERVICE COMPONENT
> A BILLING COMPONENT
> A MOBILE TRANSACTION MANAGEMENT COMPONENT
> A DISTRIBUTED SERVICES COMPONENT
> A MOBILE GATEWAY SERVICES COMPONENT
> A PAYMENT COMPONENT

ELECTRONIC COMMERCE ENABLING COMPONENTS   _56_

> A WEB SERVICES COMPONENT
> A WEB APPLICATION SERVICES COMPONENT
> A CONTENT MANAGEMENT SERVICES COMPONENT
> A REPORTING INFRASTRUCTURE COMPONENT
> A DATA SERVICES COMPONENT
> A CONTENT PERSONALIZATION COMPONENT
> AN ENVIRONMENT SERVICES COMPONENT
> AN ELECTRONIC-COMMERCE SECURITY COMPONENT

Fig. 3

CONFIGURING ARCHITECTURE FOR MOBILE ACCESS TO AT LEAST ONE BUSINESS RESOURCE

This document claims the benefit of U.S. provisional application Ser. No. 60/265,774, entitled CONFIGURING ARCHITECTURE FOR MOBILE ACCESS TO AT LEAST ONE BUSINESS RESOURCE, filed on Jan. 31, 2001 under 35 U.S.C. 119(e).

FIELD OF THE INVENTION

This invention relates to a method and system for configuring an architecture scheme for mobile access to at least one business resource.

BACKGROUND OF THE INVENTION

A communications network may provide a business entity with the ability to exchange information with trading partners, employees and independent contractors for a myriad of business-related activities. For example, business entities may exchange data over a communications network, such as the Internet, to complete a transaction involving goods, services or financial information. Because employees and independent contractors of business entities often travel, commute, and meet with business people in different geographical locations, a need arises to support the access of mobile users of mobile communication devices to one or more business resources. Mobile communication devices may include wireless phones, personal digital assistants, and other microprocessor-based communication devices that process and present information to a mobile user. For example, a wireless phone may include a display and a wireless access protocol (WAP) compatible software that supports the display of content from the Internet or internal resources of a business entity.

Providing employees and other affiliates of business entities with mobile access to a computational resource of the business entity and/or Internet resources requires considerations of various technical obstacles, including the reliability of data transmission over a wireless link, the conversion of high data rate data protocols to lesser rate data protocols or wireless data protocols, the provision of security for wireless communications networks, and interfacing the wireless environment to the communications network (e.g., Internet) via a gateway server or another mechanism. Other practical considerations in enabling mobile commercial activities include system integration of standard hardware and standard software packages that do not otherwise cooperate to form a cohesive reliable system. For example, system integration may involve modification of the standard software, authoring patches or added functionality for the standard software, and engineering a reliable hardware system. Another problem with implementing mobile commerce solutions is the training of information technology workers on both wireless communication technology and general telecommunications technology.

SUMMARY OF THE PRESENT INVENTION

The present invention discloses a system and method for configuring an architecture for a wireless communication device. In the present invention, a target list of resources is established that is to be supported by the wireless communication device. After the target list of resources is established, a set of components are retrieved that are associated with each established resource to thereby form a menu of components on the wireless communication device. Component data associated with respective components is then presented to facilitate the defining of a preferential configuration. Then, an arrangement of the component data and the components is determined from the menu to thereby form the preferential configuration.

Template data may also be presented as the component data, wherein the template data includes system architecture data and system integration data from a previous configuration of the architecture for the wireless communication device. Reference code data may also be presented as the component data. The reference code data preferentially includes a software module that supports at least one affiliated component. Reference data can also be presented as the component data, the reference data being selected from a group of reference data consisting of a technical publication, an audio-visual presentation, an audio presentation, a multimedia presentation, a technical tutorial, a marketing tutorial, and a financial data tutorial.

A product list can also be presented as the component data, wherein the product list may include a product list of suitable products that support at least one affiliated component. A suggested product list can also be presented as the component data. The suggested product list comprising a product list of suggested products that support at least one affiliated component, wherein the suggested product list is established based upon an analysis of historical performance records of the suggest products, including one or more of the following factors: cost of purchasing the product, cost of maintaining the product, reliability of the product, and availability of technical support for the product.

A vendor list can also be presented as component data. The vendor list may include suggested vendors that support at least one affiliated component and the vendor list is preferentially established based upon an analysis of historical performance records of the suggested vendors, including one or more of the following factors: reliability of the vendors' products, availability of technical support for the vendors' product, quality of customer service of the vendors, and customer satisfaction data related to the suggested vendors.

Training data can also be presented as the component data. The training data may preferentially include technical training on installation of the components of the preferential configuration and a procedure for the integration of the components of the preferential configuration. A training presentation may also be presented as the component data. The training presentation can be in the form of a textual presentation, an audio presentation, an audio-video presentation, and a multi-media presentation.

Establishing the target list may include the step of classifying the resources into enterprise applications, enterprise legacy environment, and supporting service. The enterprise applications may include at least one standard office application of a business entity. The enterprise legacy environment may include a core business system of the business entity. The supporting service may include support for an electronic commerce provision of the business entity.

The target list may also include one or more of the following: an electronic-mail application, a scheduling application, a customer relations management application, an enterprise resource planning application, a field support application, a logistics application, a purchasing application, a sales force automation application, an inventory control application, a point of sale application, a transportation application, a health care application, banking and lending application, a billing application, a marketing application, and a retail trade application.

The set of components that can be retrieved by the present invention may include one or more of the following: a presentation component, a security component, a security component, a navigational component, application development component, test tools component, an off-line synchronization component, a profile management component, a multiple device compatibility component; an alert component, a voice recognition component, a location-based service component, a billing component, a mobile transaction management component, a distributed services component, a mobile gateway services component, and a payment component.

The set of components that can be retrieved may also include one or more of the following: a web services component, a web application services component, a content management services component, a reporting infrastructure component, a data services component, a content personalization component, an environment services component, and an e-commerce security services component. The component data that is presented may include one or more of the following as the component data: template data, reference code data, reference data, suggested product data, suggested vendor data, and training data.

Further objects and advantages of the present invention will be apparent from the following description, reference being made to the accompanying drawings wherein preferred embodiments of the present invention are clearly shown.

BRIEF DESCRIPTION OF THE DRAWINGS

FIG. 2 is a diagram of an illustrative data structure of resource identifiers of respective business resources in accordance with the invention.

FIG. 3 is diagram of an illustrative data structure of components in accordance with the invention.

DETAILED DESCRIPTION OF THE PRESENTLY REFERRED EMBODIMENTS

Figure 1:
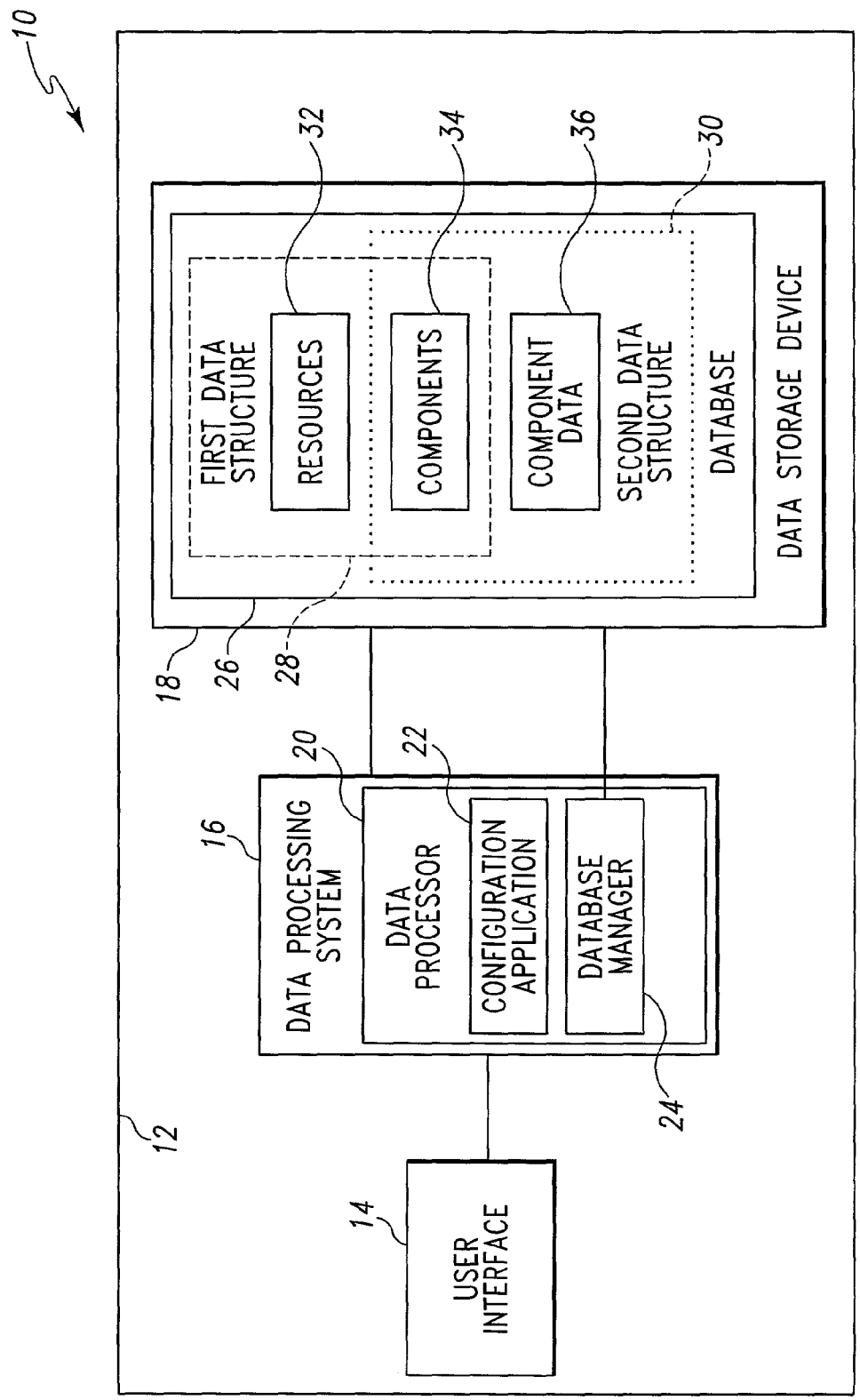
FIG. 1 is a block diagram of a configuration agent for developing a preferential architecture for the provision of mobile access of a mobile communications device to a business resource in accordance with the invention.

Referring to FIG. 1, a preferred configuration agent application 10 is disclosed that provides wireless access to at least one business resource to a wireless communication device 12. A business resource may include an internal resource, an external resource, or a combination of both. As used herein, an internal resource refers to a business resource that is offered by a corresponding business entity, while an external resource refers to a business resource offered outside of the corresponding business entity or accessible through the Internet, for example. A business resource may include one or more of the following business systems or applications: a corporate electronic mail system, a scheduling and calendar system, a directory information system, an Internet application, an intranet application, a content application, and an enterprise application. The preferred configuration agent application 10 is well suited for providing an integrated and comprehensive framework of resources and components that provide wireless access to multiple business resources in a coordinated fashion.

The configuration agent application 10 provides a user interface 14 that is coupled to a data processing system 16. In turn, the data processing system 16 is coupled to a data storage device 18. The user interface 14 preferentially provides a graphical user interface and a means for entering data by a keyboard or a touch screen, or any another similar kind of device that supports the entry of data through the data processing system 16. Those skilled in the art should recognize that several different types of user interfaces exist and may be taken advantage of by the present invention.

As further illustrated, the data processing system 16 preferentially includes a data processor 20 that includes a configuration application 22 and a database manager application 24. The configuration application 22 is operable to determine a preferential configuration from user inputs (e.g., selections) that are provided by a user through the user interface 14 and determined from data stored in the data storage device 18. During operation, the configuration application 22 is used to facilitate the development of a preferential configuration for the wireless communication device 12 in an organized and defined manner, consistent with a development framework.

The database manager application 24 facilitates the storage, retrieval, querying, and management of data stored in a database 26 located on the storage device 18. During storage, the database manager application 24 is operable to input data into or write data to the database 26. During retrieval, the database manager application 24 is operable to receive output data from or read data within the database 26. Retrieval of the appropriate data is normally done in response to a query from the data processing system 16. Preferably, the data storage device 18 hosts the database 26 and stores data in a first data structure 28 and a second data structure 30. In one embodiment, the combination of the first data structure 28 and the second data structure 30 may represent a single, global hierarchical data structure or file.

As shown in FIG. 1, the first data structure 28 includes a list of resource identifiers 32 and an affiliated list of components 34. The resource identifiers 32 are linked to applications that are used by the wireless communication device 12 during operation, such as an e-mail application for instance. An affiliated component may support the applications that are associated with a respective resource identifier 32 or may be an independent application altogether. The second data structure 30 includes the list of components 34 and the respective component data 36 that is associated with the component identified by the components 34. Component data 36 is used to support or define a corresponding component. Lines interconnecting the elements of FIG. 1 are used to indicate logical data paths between or among the elements or alternatively physical data paths between or among the elements.

The preferred configuration agent application 10 operates in the following manner. The first data structure 28 stores a candidate list of resources identifiers 32 that represent resources that are supported by the wireless communications device 12. The user interface 14 is operable to permit a user to obtain a target list of candidate resource identifiers 32 from the first data structure 28. The database manager application 24 is operable to retrieve a set of components 34 that are associated with each targeted resource identifier 32 to generate a menu of components 34. The database manager application 24 is operable to access component data 36 associated with respective components 34 to facilitate the defining of a preferential configuration. The data processing system 16 cooperates with the user interface 14 to support the generation of an arrangement of resource identifiers 32 and components 34 in the form of a menu that supports, forms, or defines the preferential architecture scheme.

Referring to FIG. 2, a preferred list of resources 32 is set forth that are preferentially stored in the database 26 within the first data structure 28. The resources 32 are preferentially classified into several main categories that include enterprise application resources 40, enterprise legacy system resources 42, and supporting service system resources 44. The particular resources provided in each of these respective categories are set forth in greater detail below. The resources 32 of FIG. 2 are preferably organized in a hierarchical format. Accordingly, each main category of resources may represent a parent, whereas multiple child resources depend upon each respective parent.

The resource categories that are located under each parent are illustrative of each general category in which each resource available to the wireless communication device 12 would fall. The nature and exact makeup of each resource within these categories would depend upon the particular business requirements of the entity for which the present invention is being designed or implemented. Each resource available will be generated as an icon that is displayed on the user interface of the wireless communication device 12.

In the preferred embodiment, enterprise application resources 40 preferentially include one or more of the following resources: office-enablement application resources 46, standard business application resources 48, and custom business application resources 50. Office enablement application resources 46 preferentially include an electronic-mail application resource and a scheduling application resource.

The preferred standard business application resources 48 preferentially include a customer relations management application resource, an enterprise resource planning application resource, a field support application resource, a logistics application resource, a purchasing application resource, a sales force automation application resource, an inventory control application resource, and a point-of-sale application resource.

Custom business application resources 50 preferentially include a transportation application resource, a lending or financing application resource, a banking application resource, a financial management application resource, a distribution or retail trade application resource, a record management application resource (e.g., health insurance application resource), and a user-definable custom business application resource.

Enterprise legacy system resources 42 preferentially include a customer relations management application resource, a billing application resource, an enterprise resource planning application resource, an enterprise resource planning application resource, and a customer insight or marketing application resource. Supporting service application resources 44 preferentially include a customer care application resource, a hosting application resource, a procurement application resource, a device management and provisioning application resource, or any other resource for supporting mobile electronic commerce.

FIG. 3 illustrates the preferred components 34 which may be stored in the database 26 within the second data structure 30. The components 34 are preferably organized into several classifications or distinct sets, including basic components 52, enhanced components 54 and electronic commerce enabling components 56.

In the preferred embodiment of the present invention, the basic components 52 preferentially include one or more of the following components: a presentation component, a security component, a basic alert component, a navigational component, an application development component, a test tools component, an off-line synchronization component, a profile management component, and multiple-device compatibility component.

The enhanced components 54 preferentially include one or more of the following components: an enhanced alert component, a voice recognition component, a location-based service component, a billing component, a mobile transaction management component, a distributed services component, a mobile gateway services component, and a payment component.

The electronic commerce enabling components 56 preferentially include one or more of the following components: a web services component, a web application services component, a content management services component, a reporting infrastructure component, a data services component, a content personalization component, an environment services component, and an e-commerce security services component.

Referring once again to the basic components 52, the presentation component provides applications that facilitate presentation and rendering of services on the wireless communication device 12. The presentation component provides web server software that is used to provide access to content that is published in a mark-up language via the wireless communication device 12. The presentation component may include a formatter and a presentation module for rendering content at the server transmitted to the wireless communication device 12 from a server. The presentation component is preferably associated with an adaptive user interface (AUI) as the user interface 14.

The software of the presentation component may facilitate the remote generation of a hyper-text transfer protocol (HTTP) request, which are generated by user inputs into the wireless communication device 12. The HTTP request then emanates from a network element source coupled to a communications network and interacts with a business resource coupled to a communications network (e.g., Internet). The presentation component may be affiliated with a suggested product and suggested vendor list as component data 32. For example, the presentation component may be linked or associated with a product offering from a particular supplier (e.g., Everypath) that supports one or more aspects of the presentation component.

The security component provides identification and password verification that may function on a user-by-user basis, a service-by-service basis or a feature-by-feature basis. For example, in the context of a user-by-user basis, the security component may deny or allow access to a wireless communication device 12, based on the mobile user's entry of an identifier and a password that allows access to a particular resource. The security component may provide assurance that mobile transactions occur in a secure manner and preserve data integrity of data associated with the business resource. The security component may entail one or more of the following procedures: authorization, authentication, auditing and encryption.

The basic alert component is an application used to inform a user of the wireless communication device 12 of pertinent information based upon the detection of a predetermined event. An event may refer to the triggering of an alarm or another condition detectable by a business resource. An alert does not require the user to interact, but often causes the user to initiate a transaction or a reactionary interaction with the wireless communication device 12 and, in turn, the business resource. In alternative embodiments, alerts may be triggered by the changing of values in a predetermined database of a business resource.

The navigational component supports a definition (e.g., a standard) of a customizable menu, a start-up display page, or an index presented on the wireless communication device 12. The navigational component is preferentially transmitted to the wireless communication device 12 to facilitate a user's navigation to a desired resource, among a group of resources provided via the wireless communication environment. In one embodiment, the navigational component preferentially dynamically generates a user start-up page based on a user's profile (e.g., a specification of resources and features available on each resource for a particular user). For example, the user start-up page may only include areas to which the mobile user has been granted access by the business entity through the profile management component, as set forth below.

The application development component assists in the development of mobile applications by providing access to one or more of the following resources: a source code editor, a compiler, a linker, an interpreter, and code generation tools. The test tools component identifier provides a link to test tool components that support an approved development environment and provide tools for the identification and resolution of source code issues. Application development components and test tool components support a systematic and complete testing approach through the use of a support repository to manage data required by test sub-components.

The off-line synchronization service supports the ability of users of the wireless communication device 12 to continue working when not actively connected to the communication network or a business resource. The off-line synchronization service component supports resources that do not make the assumption that users are always connected to the wireless communication network. The off-line synchronization service component supports processing when a user is off-line and provides a mechanism for synchronization of the updating of the modification of data associated with the wireless network and with various data storage devices in the network.

The profile management component provides the mobile user with the ability and authorization to carry out one or more of the following activities in relation to a users profile: reading, writing, creating and deleting data. Profile management components may provide a service provider or a business entity with the ability to define the privileges of reading, writing, creating and deleting data of one or more resources on a user-by-user basis. The profile management component provides the ability to administer and manage user access, user privileges, access of user groups, privileges of user groups, access to particular services or features, and permitted use with respect to at least one business resource.

The multiple device compatibility component controls the extent of services, applications, or resources that a user of the wireless communication device 12 can access. Multiple device compatibility components refers to the ability of a business entity to support data transfer between any given resource and the wireless communication device 12. In the preferred embodiment, the multiple device compatibility components support the following mark-up languages, protocols, and operating systems: wireless hypertext markup language (WHTML), extensible mark-up language (XML), wireless mark-up language (WML), hand-held device mark-up language (HDML), wireless access protocol (WAP), hyper-text transfer protocol (HTP), hyper-text transfer protocol secure (HTTPS), Windows CE operating system, PALM operating system, PALM Webcippings, EPOC, or any suitable mark-up language or operating system. The above-referenced mark-up language, protocols and operating systems should be viewed in an illustrative sense and not as a limitation of the present invention.

As previously set forth and referring to FIG. 3, the enhanced components 54 refer to one or more of the following components: an enhanced alert components, a voice recognition component, a location-based service component, a billing component (e.g., service rating component), a mobile transaction management component, a distributed services component, a mobile gateway services component, and a payment component.

The enhanced alert component 54 provides an advanced set of alert services. For example, an enhanced alert component may provide personalized user alerts, customizable through distribution groups, distribution channels, and actionable alerts. Actionable alerts may be supported by two-way message signaling or otherwise. The voice recognition component that supports the ability to integrate data and voice channels to enable voice communications, voice command recognition and voice response capabilities. In one embodiment, the voice recognition component supports a voice interface standard such as voice XML (VXML).

The location-based service component provides business resources that include data that is generated based on the geographic location of the wireless communications device 12. In one example, the business resource may change the start-up page that is generated on the wireless communication device 12 based on the geographic location of the wireless communications device 12. In another example, the business resource may change information that is fed to the wireless communications device 12 depending on the geographic location of the wireless communications device 12 with the location-based service component.

The billing components provide users of the wireless communication device 12 with various types of information relating to the charges associated with the wireless communication device 12. For example, the billing components may keep track of usage charges based on time, usage charges based on calling area, charges for items purchased or any other type of application that has a charge associated with it for use.

The distributed services component provides the ability to manage data that is distributed across the wireless communication device 12, a server or the data network.

The mobile transaction management component provides reliability and security measures to preserve the integrity and reliability of transactional data and transactions involving business resources and the wireless communication device 12. In one embodiment, the mobile transaction component may adhere to ACID properties for transactions. ACID refers to atomic, consistent, integrity and delivery. In another embodiment, the mobile transactions management component supports store and forward data transfer and guaranteed delivery of transactional data or execution of transactions between the wireless communications device 12 and a business resource.

The mobile gateway services component provides the ability for a business entity to provide its own mobile gateway service. The business entity may provide one or more of the following features for their respective mobile gateway service: encryption, authorization, authentication, auditing services, connectivity to resources, scalability, data protocol conversion, and interfacing management.

The payment component allows users to change or pay for digital content. For example, a user may be subscribing to digital content that they no longer desire to receive, the payment component provides the user with the ability to unsubscribe to the service that is providing the digital content or vice versa.

As previously set forth, the e-commerce enabling components 56 refer to one or more of the following components: web services components, a web application services component, a content management services component, a reporting infrastructure engine component, a data services component, a content personalization/ aggregation component, an environment services component, and an e-commerce security services component.

As illustrated in FIG. 3, the web services component provides software used to serve content to the wireless communication device 12. The web services component may provide content to mobile users via proxies or remote HTTP requests. For example, a user may enter a command on a wireless communication device 12, which is transmitted as a short-messaging-service (SMS) data message or a wireless-access-protocol (WAP) data message to a wireless gateway. In turn, the wireless gateway converts the SMS data message or WAP data message into an HTTP request for transmission over the communications network to foster compatibility and communications with a business resource or website. Accordingly, the web service component may represent the wireless gateway or another interface between the wireless network and the communications network. The web service component may provide general web server services such as caching, page rendering, proxy services, interface protocol support, audit logging and session security services. Interface protocol support may include CGI, NSAPI, and ISAPI, however these interface protocols should be viewed as illustrative only and not as a limitation of the present invention.

The web application services component provides a connection to a server that forms part of a multi-tier architecture that supports wireless commercial applications by separating business logic and enterprise applications from presentation to the wireless communication device 12.

The content management services component provides the ability to manage content on a web site or another network element affiliated with the communications network via the wireless communication device 12. Managing content includes controlling (e.g., filtering) content to be published on a web site, testing the content for appropriate performance, and ensuring that the content has progressed through appropriate control mechanism for approval and verification.

The reporting infrastructure component or the electronic commerce enabling components are used to view and generate various types of reports that are used or required by a business enterprise. These reports may be generated by mining data from various databases within the enterprise or by manually inputting and creating the data. Those skilled in the art should recognize that various types of reports could be generated and used in the present invention.

The data services component provides access to large quantities of data in a structured manner. The data services components may include a database that contains reference and transactional data tables to support application architecture, e-commerce activities or the like. The data storage device may or may not be located on the wireless communication device 12. The data services component may create one or more standardized query language statements for optimized data modifications.

The content personalization component supports the ability to generate dynamic content or dynamic services based upon a user profile. The user profile may contain data on security level access authorization or other subscriptions of the mobile subscriber. In addition, the environmental services components may contain user preference and data describing the user. The environment service component provides services that enable the applications to scale and continue to run without down time. The services may involve load balancing, error handling, transaction logging and other services. The electronic-commerce security component provides a secure means for the wireless communication device 12 to conduct commercial transactions with various electronic business resources.

The preferred configuration agent 10 facilitates the assembling and arranging of the foregoing resources and components to provide access to the wireless communication device 12 to mobile enterprise applications, mobile enterprise legacy systems, and mobile supporting services. Mobile application adapters allow mobile users to use standard applications in the area of enterprise applications, enterprise legacy systems and supporting systems.

Figure 4:
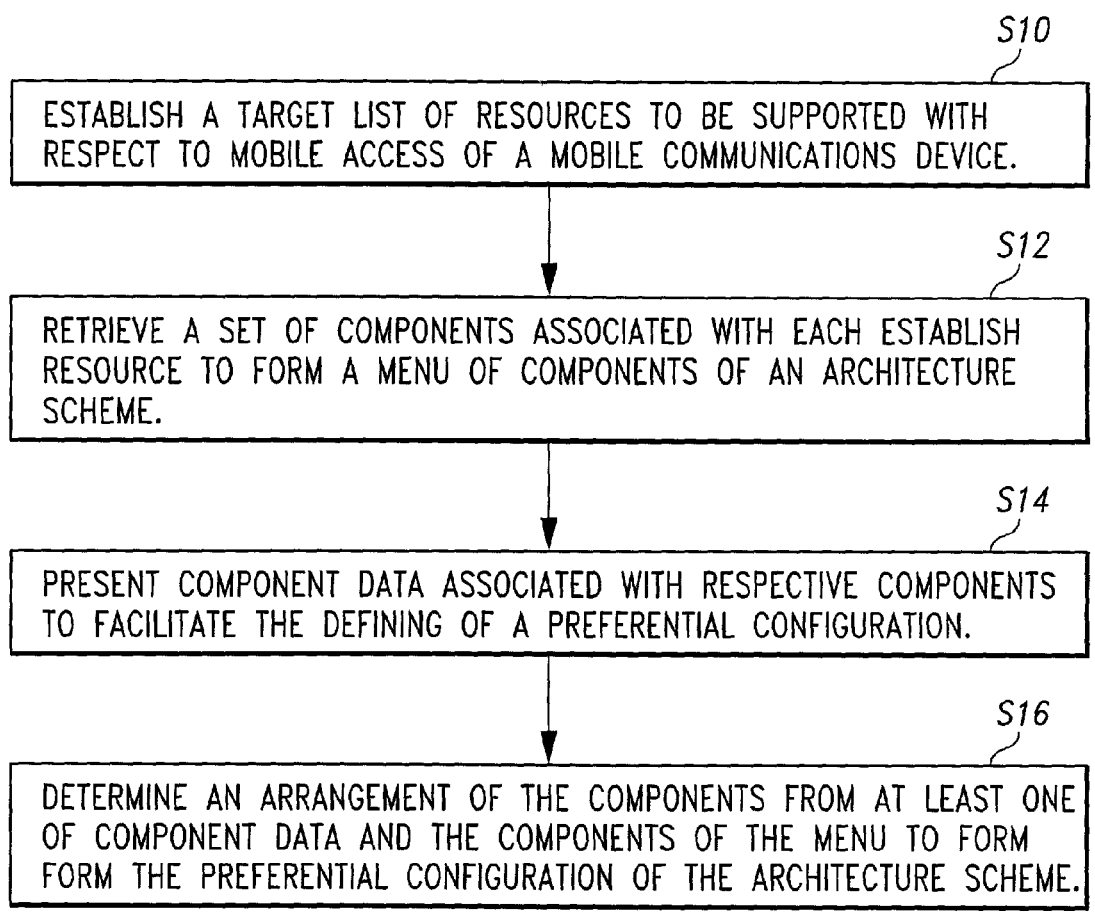
FIG. 4 is a flow chart of a method of configuring an architecture scheme for provision of mobile access of a mobile communications device to a business resource in accordance with the invention.

FIG. 4 illustrates a method of configuring an architecture scheme for provision of mobile access to a mobile communications device in accordance with the invention. The method of FIG. 4 begins in step S10.

In step S10, a user of the configuration agent 10 establishes a target list of resources (e.g., business resources) to be supported by the wireless communications device 12. In the preferred embodiment, the database manager 24 may retrieve a candidate list of resource identifiers 32 from the database 26. The user will then be presented with a list or menu of one or more of the following resources (e.g., applications) as represented by resource identifiers 32: enterprise applications, enterprise legacy systems, supporting services systems, standard office applications, horizontal business applications, custom vertical applications, back-office systems, and applications or any other applicable systems for supporting a mobile commerce solution. The user interface 14 cooperates with the data processor 20 to allow the user to select or enter the target list as a subset of the candidate list.

In step S12, the database manager 24 or the data processing system 16 retrieves a set of components associated with each established resource and other available components to form a menu of components of the architecture scheme. The database manager 24 retrieves components of the architectural framework that are relevant to the target mobile applications. For example, based on the retrieval, the user interface 14 displays a menu of components denoting whether the component is required for supporting a desired resource or a desired feature of an established resource.

In step S14, the user interface 14 presents component data 36 associated with respective components to facilitate the defining of a preferential configuration. The database manager 24, the configuration module 16 or both may establish an index or a table of contents to the component data 32 that enables a selection of component data 32 to be presented to the user via the user interface 14.

The foregoing description of the system and method describe several illustrated examples of the invention. Modifications, alternative arrangements, and variations of these illustrated examples are possible and may fall within the scope of the invention. Accordingly, the following claims should be accorded the reasonably broadest interpretation, which is consistent with the specification disclosed herein and not unduly limited by aspects of the preferred embodiments disclosed herein.

What is claimed is:

1. A method of configuring an architecture for a wireless communication device, comprising the steps of:
   establishing a target list of internal business resources to be supported by the wireless communication device based upon a user profile;
   retrieving a set of components associated with each established internal business resource to form a menu of components;
   forming a presentation comprising component data associated with respective components, the component data comprising template data and reference data, the template data comprising system architecture data and system integration data from a previous configuration of the architecture for the wireless communication device, the reference data including a marketing tutorial and a financial data tutorial;
   determining an arrangement of the component data and the components from the menu to form the preferential configuration, the arrangement including a menu of components denoting whether the component is required for supporting an internal business resource;
   forming the preferential configuration based upon the internal business resources to which the user has been provided access; and
   limiting the capability of the user to write and delete data associated with one or more of the internal business resources based upon the user profile.

2. The method of claim 1, wherein the step of forming a presentation further comprises reference code data as the component data, the reference code data including a software module that supports at least one affiliated component.

3. The method of claim 1, wherein the step of forming a presentation further comprises a product list as the component data, the product list including a product list of suitable products that support at least one affiliated component.

4. The method of claim 1, wherein the step of forming a presentation further comprises a suggested product list as the component data, the suggested product list including a product list of suggested products that support at least one affiliated component, wherein the suggested product list is established based upon an analysis of historical performance records of the suggested products, including the availability of technical support for the product.

5. The method of claim 4, wherein the step of forming a presentation further comprises establishing a vendor list as component data, the vendor list including suggested vendors that support at least one affiliated component, the vendor list being established based upon an analysis of historical performance records of the suggested vendors, including customer satisfaction data related to the suggested vendors.

6. The method of claim 5, wherein the step of forming a presentation further comprises presenting a procedure for integration of the components of the preferential configuration.

7. The method of claim 1, wherein the step of establishing the target list further comprises classifying the resources into enterprise applications, enterprise legacy environment, and supporting service, wherein the enterprise applications include at least one standard office application of a business entity, wherein the enterprise legacy environment includes at least one core business system of the business entity, wherein the supporting service includes support for an electronic commerce provision of the business entity.

8. The method of claim 1, wherein the step of establishing a target list of internal business resources comprising establishing a customer relations management application.

9. The method of claim 1, wherein the retrieving step further comprises executing a navigational component configured to dynamically generate a user start-up page based on the user profile.

10. The method of claim 9, wherein the retrieving step further comprises executing a location-based service component configured to determine the geographic location of the wireless communications device wherein the navigation component is configured to dynamically generate a user start up page responsive to geographic location of the wireless communication device.

11. The method of claim 8, wherein the step of establishing a target list of internal business resources includes establishing an enterprise resource planning application.

12. The method of claim 11, wherein the step of establishing a target list of internal business resources includes establishing a field support application.

13. The method of claim 12, wherein the step of establishing a target list of internal business resources includes establishing a sales force automation application.

14. The method of claim 13, wherein the step of establishing a target list of internal business resources includes establishing an inventory control application.

15. The method of claim 14, wherein the step of establishing a target list of internal business resources includes establishing a record management application.

16. The method of claim 15, wherein the step of establishing a target list of internal business resources includes establishing a banking and lending application.

17. The method of claim 16, wherein the step of establishing a target list of internal business resources includes establishing a retail trade application.

18. The method of claim 9, further comprising the step of determining the geographic location of the wireless communications device, wherein the navigation component is configured to dynamically generate a user start up page based on the geographic location of the wireless communications device.

19. The method of claim 9, wherein the retrieving step further comprises retrieving a profile management component configured to manage user access to internal business resources.

20. The method of claim 19, wherein the navigation component dynamically generates a user start up page responsive to the profile management component.

21. The method of claim 1, wherein the target list of business resources includes external business resources.

22. A system for configuring an architecture for a wireless communication device, comprising:
   a database for storing a candidate list of internal business resources to be supported by the wireless communication device, the internal business resources including an application development component configured to provide access to tools for development of software, the database adapted to store a set of components associated with at least one respective internal business resource of the candidate list and a user profile associated with the wireless communication device;
   a user interface for establishing a target list from the candidate list of internal business resources, the user interface configured to display a customized menu of internal business resources based upon a user profile, the user interface configured to display a menu of components denoting whether the component is required for supporting an internal business resource;

a database manager arranged to retrieve a set of components associated with each targeted business resource to form a menu of components, the database manager arranged to access component data associated with respective components to facilitate the definition of a preferential configuration, the database manager adapted to limit the capability of a user to write and delete component data associated with one or more internal business resources based upon the user profile; and a data processor configured to cooperate with the user interface to support determination of an arrangement of at least one of the component data and the components from the menu to form the preferential configuration of the architecture;

wherein the component data comprises reference data that includes a marketing tutorial and a financial data tutorial; and wherein the component data comprises reference code data including a software module that supports at least one affiliated component.

23. The system of claim 22, wherein the candidate list of internal business resources of the database comprises a customer relations management application.

24. The system of claim 22, wherein the set of components of the database comprises a navigational component configured to generate a user start-up page based on the user profile.

25. The system of claim 24, wherein the set of components of the database comprises a location-based service component configured to determine the geographic location of the wireless communications device wherein the navigation component is configured to dynamically generate a user start-up page responsive to the location-based service component.

26. The system of claim 22, wherein the component data comprises a product list of suggested products that support at least one affiliated component.

27. The system of claim 22, wherein the component data comprises a product list of suggested products that support at least one affiliated component, the product list being established based upon an analysis of historical performance records of the suggested products, including availability of technical support for the product.

28. The system of claim 22, wherein the component data comprises a vendor list of suggested vendors that support at least one affiliated component, the vendor list established based upon an analysis of historical performance records of the suggested vendors, including customer satisfaction data related to the suggested vendors.

* * * * *

UNITED STATES PATENT AND TRADEMARK OFFICE
CERTIFICATE OF CORRECTION

| | | |
|---|---|---|
| PATENT NO. | : 7,039,591 B2 | Page 1 of 1 |
| APPLICATION NO. | : 10/059502 | |
| DATED | : May 2, 2006 | |
| INVENTOR(S) | : Terry Robert Ecklund et al. | |

It is certified that error appears in the above-identified patent and that said Letters Patent is hereby corrected as shown below:

Column 3,
Line 6, change "a security component, a security component,' to --a security component--.

Column 5,
Line 53, change "an enterprise resource planning application resource, an enterprise resource planning application resource," to --an enterprise resource planning application resource,--.

Column 8,
Line 1, change "(HTP)" to --(HTTP)--.

Signed and Sealed this

Fifteenth Day of August, 2006

JON W. DUDAS
*Director of the United States Patent and Trademark Office*